(12) United States Patent
Sanford et al.

(10) Patent No.: US 8,285,837 B2
(45) Date of Patent: Oct. 9, 2012

(54) RECORDING AND/OR USE OF GENERATION INFORMATION

(75) Inventors: Marc M. Sanford, Seattle, WA (US); Steven R. Ebeling, Seattle, WA (US); Anthony Schlee, Kenmore, WA (US)

(73) Assignee: Microsoft Corporation, Redmond, WA (US)

( * ) Notice: Subject to any disclaimer, the term of this patent is extended or adjusted under 35 U.S.C. 154(b) by 343 days.

(21) Appl. No.: 12/241,752

(22) Filed: Sep. 30, 2008

(65) Prior Publication Data

US 2010/0082736 A1 Apr. 1, 2010

(51) Int. Cl.
*G06F 15/16* (2006.01)
(52) U.S. Cl. ....... 709/224; 709/202; 709/219; 705/7.29; 717/174; 717/178
(58) Field of Classification Search .......... 709/200–253; 370/400; 705/7.29; 717/174, 176–178
See application file for complete search history.

(56) References Cited

U.S. PATENT DOCUMENTS

| | | | |
|---|---|---|---|
| 6,697,837 B1 | 2/2004 | Rodov | |
| 6,874,024 B2 | 3/2005 | Cohen et al. | |
| 6,944,660 B2 | 9/2005 | Eshghi et al. | |
| 2002/0116494 A1 | 8/2002 | Kocol | |
| 2004/0220850 A1 | 11/2004 | Ferrer et al. | |
| 2006/0224729 A1* | 10/2006 | Rowe et al. | 709/224 |
| 2006/0230061 A1 | 10/2006 | Sample et al. | |
| 2006/0271671 A1 | 11/2006 | Hansen | |
| 2007/0294281 A1 | 12/2007 | Ward et al. | |
| 2009/0003355 A1* | 1/2009 | Jain et al. | 370/400 |
| 2009/0327434 A1* | 12/2009 | Reynolds | 709/206 |

FOREIGN PATENT DOCUMENTS

| | | |
|---|---|---|
| KR | 1020010007768 A | 2/2001 |
| KR | 1020010084001 A | 9/2001 |
| KR | 1020030060849 A | 7/2003 |

OTHER PUBLICATIONS

International Search Report and Written Opinion of the International Searching Authority, dated May 6, 2010, Application No. PCT/US2009/056764, 11 pages.
"Microsoft SharePoint Team Blog", Retrieved at <<http://blogs.msdn.com/sharepoint/>>, dated: May-Jun. 2008, pp. 1-50.
"adCenter Analytics—How to Get Started", Retrieved at <<http://blogs.msdn.com/adcenter/archive/2008/03.aspx>>, dated: Mar. 2008, pp. 1-61.
"Taking Business Web Sites to the Next Level", Retrieved at <<http://msdn.microsoft.com/en-us/library/ms953581.aspx>>, retrieved on Jun. 25, 2008, pp. 1-14.

* cited by examiner

*Primary Examiner* — David Lazaro

(57) ABSTRACT

An object (e.g., a video, a widget, etc.) may carry generation information, indicating the length of the referral chain that led to the object's being downloaded. Some users become aware of the object through initial publicity. When these users download an instance of the object, that instance is a generation zero instance. The object may contain a mechanism (e.g., a link) that invites other users to download an instance of the objects. When a user follows such a link and downloads an instance of the object, the downloaded instance has a higher generation than the instance that presented the link to the user. For example, if a generation zero object refers a download, then the downloaded object instance may have generation one. Generation information may be collected and analyzed to determine how successfully an object propagates.

20 Claims, 5 Drawing Sheets

RECORDING AND/OR USE OF GENERATION INFORMATION

BACKGROUND

Various types of objects, such as videos, widgets, applications, etc., propagate through social networks. For example, a person may install a video on his or her web site. Other people may then see the video and decide to install it on their own web sites. There may be an initial user, or group of users, who download the object without having seen a copy of the object. These users may have learned about the object from an original source, such as from the object's creator or through a publicity campaign. However, once that initial group has downloaded the object and has installed instances of the object where others can see it (e.g., on a web site), the object propagates when one user sees the object and is thereby encouraged to obtain a copy for himself or herself.

Some types of objects propagate by referring an interested entity to a server that provides and/or installs a copy of the object. For example, a widget might provide a link that allows a user to get a copy of the widget. Thus, if a person sees the widget on a web site and is interested in obtaining the widget for his or her own site, the person could click the link. The link would contact the server and set in motion the process of providing and/or installing the widget. In this sense, certain objects propagate by way of referrals: one instance of an object makes a referral, which results in another instance of the object being obtained.

The fact that an object has propagated through referrals provides clues about how objects move through a social network. For example, objects may initially be promoted through some sort of publicity effort, and then may propagate from person to person through a chain of referrals. It may be of interest to know how many instances of the object are downloaded as a result of the initial publicity effort, and how many instances are downloaded as a result of referrals. Moreover, it may be of interest to know how long a chain of referrals is. For example, the fact that an object was downloaded through a chain of referrals that passed through, say, fifteen people may suggest that the object, or its initial publicity campaign, are particularly effective at encouraging propagation. However, objects and the systems in which they are distributed typically do not support the marshaling and analysis of this type of information.

SUMMARY

An instance of an object may provide generation information, which may indicate the length of the chain of referrals that leads back to the object's organic source. When an object is first made available, some entities obtain instances of the object without having been referred through other instances of that object. For example, a marketing or publicity campaign, or a direct contact from an object's creator, may lead some people to obtain a copy of the object. Object obtained in this manner are obtained from organic sources, and may be labeled as zero-th generation objects (or, as another example, first generation objects, depending on what one considers to be the appropriate starting number for counting generations).

Objects may provide mechanisms that refer users or other entities to download the object. For example, a widget or video may display a link that says "Click here to obtain a copy of this object." If a user clicks the link to contact a download server that provides instances of the object, then the user may be said to have obtained the object as the result of a referral. If the object that presented the link to the user is a zero-th generation object, then—when following that link results in a download of a new copy of the object—that new copy may be labeled a first generation object. Similarly, if the user is referred by a first generation object, then the copy of the object that the user downloads as a result of that referral may be called a second generation object. And so on.

Generation information may be analyzed to determine how well an object propagates. Thus, if the highest generation number that is known to exist is generation zero, then the object may be said to propagate poorly. If objects of high generation number are determined to exist (e.g., generation number twenty, thirty, etc.), then there may be some aspect of the object, or of the way in which the object was promoted, that makes the object particularly good at propagating. These kinds of facts may be of interest to object creators and/or distributors, since they suggest ways to propagate objects. Thus, the generation numbers of various instances of an object could be collected and analyzed.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
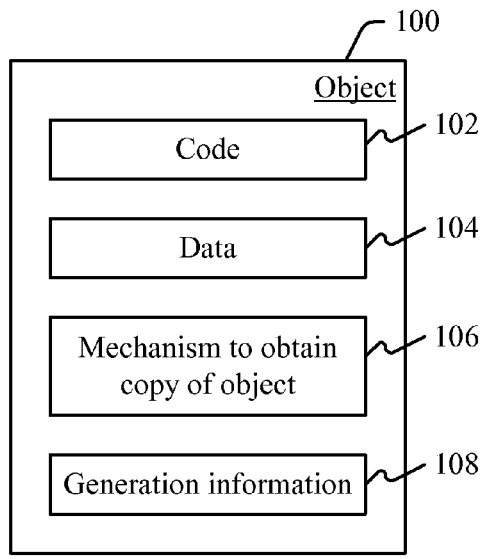
FIG. 1 is a block diagram of an example of an object that incorporates, or otherwise makes use of, generation information.

The web allows users to obtain various types of objects that may be displayed and/or propagated in a social context. For example, a person (or other entity) may have a web site, a page on a social networking site (e.g., Facebook, MySpace, etc.), or a desktop and may display an object on that site, page, or desktop. Examples of objects that could be displayed include videos, mini-applications (e.g., widgets, etc.), or other kinds of objects. The object is typically obtained from a web source. Thus, a person who becomes aware of the object may go to the download site for that object and may obtain the object.

People become aware of objects through different channels. Understanding these channels may provide clues about how a particular object propagates through a social medium or social network. (A social network might be implemented through a social networking web site; however, in general, a social network may include any collection of people and/or other entities that may communicate with each other, regardless of how such communication is implemented.) For example, an advertising campaign might be created to promote an application. An example of such an application is a widget that may be installed on a web page to display the weather report from a particular weather service. Some people might learn of the widget from the advertising campaign, and others might learn of the widget from other users. The provider of the widget might wish to learn how many downloads of the widget are directly due to the advertising campaign, and how many are due to social propagation through other users. The widget provider may operate a site that downloads and/or installs copies of the widgets. However, the provider may be unaware of whether the impetus for a particular download of the widget was the advertising campaign itself or social propagation that is one or more degrees removed from the advertising campaign. The subject matter herein provides mechanisms through which information may be obtained about how an object propagates.

The notion of a generation may be associated with an object. When an object is downloaded (or otherwise obtained), it is associated with a particular generation. If an object is obtained without any ostensible referral through another instance of the object, then that instance of the object may be assigned generation zero. On the other hand, if the object appears to have been obtained as a result of a referral, then the object may be assigned a generation that is one higher than the generation of the referring object. Thus, a user may interacts with an n-th generation copy of an object on a web site and may decide to download the object for his or her own web site by following a link provided by the n-th generation copy. When the user follows the link and downloads the object, the download site may learn that the user was referred by an n-th generation copy, and may assign generation n+1 to the new copy. (Using the numbers 0, 1, 2, etc., is one example of a generation numbering scheme, although any other numbering scheme could be used.) Information about the generation numbers of objects that have made referrals may provide clues about how an object is being propagated.

Turning now to the drawings, FIG. 1 shows an example of an object 100 that incorporates, or otherwise makes use of, generation information. Object 100 may comprise code 102 and/or data 104. For example, object 100 could be a widget that may comprise code 102 to implement some type of action (e.g., displaying the weather), and that may also comprise data 104 (e.g., graphics, text, network addresses, etc.) that may be used by code 102. As another example, object 100 could be a video, in which case data 104 could comprise some representation of moving images and code 102 may comprise a player that renders the moving images. (These objects could be installable on a web page, a desktop, or in any other context.) These are some examples of object 100, although object 100 could take any form. Moreover, object 100 is shown as having both code 102 and data 104, although object 100, alternatively, could have code 102 without data 104, or vice versa.

One feature that object 100 may have is a mechanism 106 to obtain a copy of object 100. For example, if object 100 is a widget, then object 100 might contain some text such as "Click here to get this widget for your web page." Similar text could be used in the cases where object 100 is a video, an audio clip, or any other type of object. The text could link to a download server that provides copies of object 100. Thus, if a user clicks on the text, then the user's browser could be pointed to the Uniform Resource Locator (URL) of the download server that provides copies of object 100. Such a link is an example of mechanism 106, although any mechanism to obtain a copy of object 100 could be provided.

Another feature that object 100 may have is generation information 108. Generation information 108 may indicate whether a given instance of object 100 was obtained through a referral by another instance of object 100. Generation information 108 may also indicate how long a chain of referrals was involved. For example, if the download of an object instance can be traced back to an original copy through a chain having a length of three referrals, then the object instance may be said to have a generation count of three. As noted above, object 100 may provide a mechanism 106 that assists users to obtain a copy of object 100. Thus, some instances of object 100 are obtained by referral through mechanism 106, but other instances may be obtained from sources that may be viewed as organic. For example, some initial set of users may download object 100. The initial set of users may have learned about object 100 from a source such as an advertising campaign, or through word-of-mouth from the object's creator. These users' downloading of the object may be viewed as organic, in the sense that the download was not initiated through the mechanism 106 of some instance of object 100. (Or, at least, the download may be organic in the sense that the act of downloading is not traceable to a referral from an instance of object 100.) Downloads that are organic in this sense may be referred to as being of generation zero. On the other hand, downloads that are initiated as a result of a referral by an existing instance of object 100 may be viewed as having a generation greater than zero. For example, if a zero-th generating instance of object 100 refers a user to download that object, then the resulting download may be an instance of object 100 that is generation one. If a generation one object makes the referral, then the resulting download may be of generation two. And so on. Generation information 108 reflects the generation of a given instance of object 100. (In the examples herein, the first generation is designated as zero, and each subsequent generation increases the generation count by one. However, this is an arbitrary example of a numbering scheme. Thus numbering scheme, or any other numbering scheme, could be used.)

Figure 2:
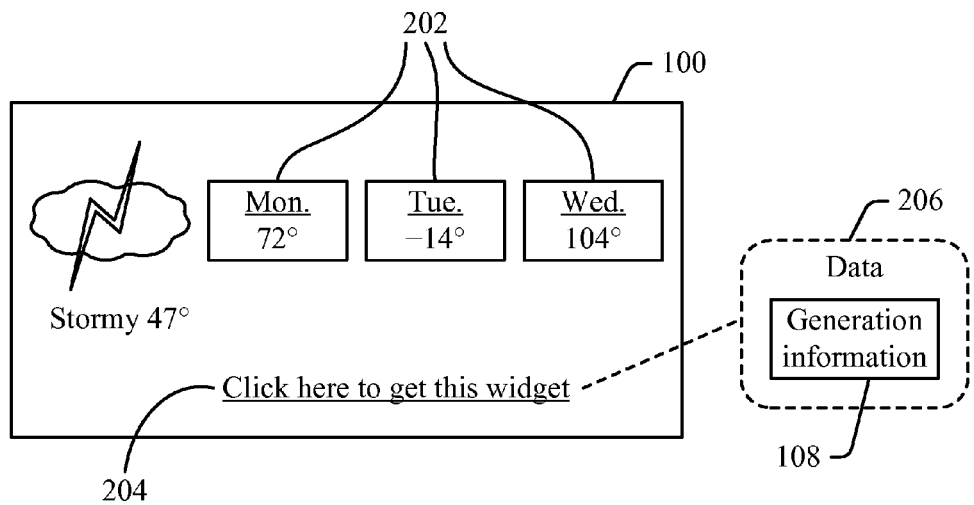
FIG. 2 is a block diagram of an example object.

FIG. 2 shows an example object 100. In the example of FIG. 2, object 100 takes the form of a widget that displays the weather. As noted above, object 100 could be any sort of application, video, audio, etc., so the weather-displaying widget of FIG. 2 is merely an example. (In the example of FIG. 2, object 100 displays content (i.e., a weather forecast). An object could display content as shown in FIG. 2, but could also interact with a user in some other manner. For example, an object could be a game application that engages in some sort of two-way interaction with a user.) Object 100 displays various user interface (UI) elements 202. With reference to the example of a weather-displaying widget, UI elements 202 could include graphic and/or text indicating current or future weather conditions. Object 100 may also display a link 204 to obtain a copy of object 100. For example, if object 100 is a widget installed on a particular web page, a user who views the web page might see the widget and decide that he or she would like the widget for his or her own web page. Link 204 could be used to obtain a copy of the widget. Link 204 is an example of a mechanism to obtain a copy of an object (e.g., mechanism 106, shown in FIG. 1).

Link 204 may incorporate, or make use of, data 206 that comprises (or is derived from) generation information 108. For example, generation information 108 may indicate that object 100 is a zero-th generation object. This fact may be incorporated into link 204. Thus, if a user clicks link 204 to obtain an instance of object 100, the link may indicate, to the server that provides the object, the generation of the instance of the object that inspired the download.

Link 204 could incorporate, or make use of, the generation information in any form. More generally, the mechanism that is used to obtain a copy of object 100 (whether that mechanism is link 204, or some other mechanism) could incorporate or use generation information in any form. However, FIG. 3 shows one example of a form in which generation information could be included in a link.

Figure 3:
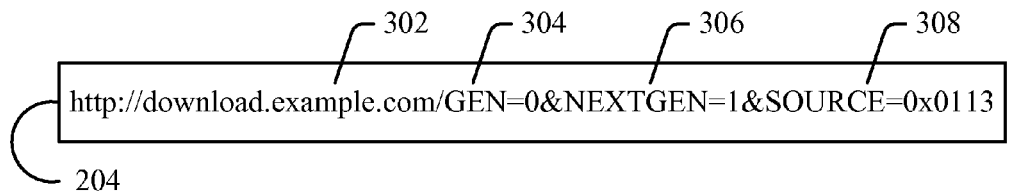
FIG. 3 is a block diagram of an example link that provides generation information.

In FIG. 3, link 204 contains a Uniform Resource Locator (URL) 302. URL 302 points to a download server (named "download.example.com"). Additionally, URL 302 may contain various components, such as generation number 304. In the example of FIG. 3, generation number 304 is represented by the string "GEN=0", although generation number 304 could be represented in any manner. Generation number 304 indicates that the instance of object 100 that is making a referral to the download server is a zero-th generation instance of the object. Link 204 could also contain other components, such as the number 306 of the next generation (i.e., the generation number to be assigned to a new instance of object 100, in the event that the referral through link 204 results in a download of that object). In the example of FIG. 3, number 306 is represented by the string "NEXTGEN=1", although number 306 could be represented in any manner.

Another example of a component that link 204 could contain is a source identifier 308, which may identify the particular instance of object 100 that is making a referral. Another possible use of source identifier 308 is to identify the first-generation instance of object 100 that led to the current referral. Thus, referrals of object 100 may be viewed as having different lineages, each leading back to a particular original (generation zero) downloader. When objects are viewed as having lineages, source identifier 308 may identify a particular instance of an object as being part of a particular line, by identifying the generation-zero instance of object 100 in the chain that led to the current instance of the object. In order to respect users' privacy, instances of objects could be identified without any personally identifiable information. Thus, in the example of FIG. 3, source identifier 308 is represented by the string "SOURCE=0x0113", where "0x0113" could identify a particular instance of object 100 while maintaining the anonymity of a particular person or entity associated with object 100.

Figure 4:
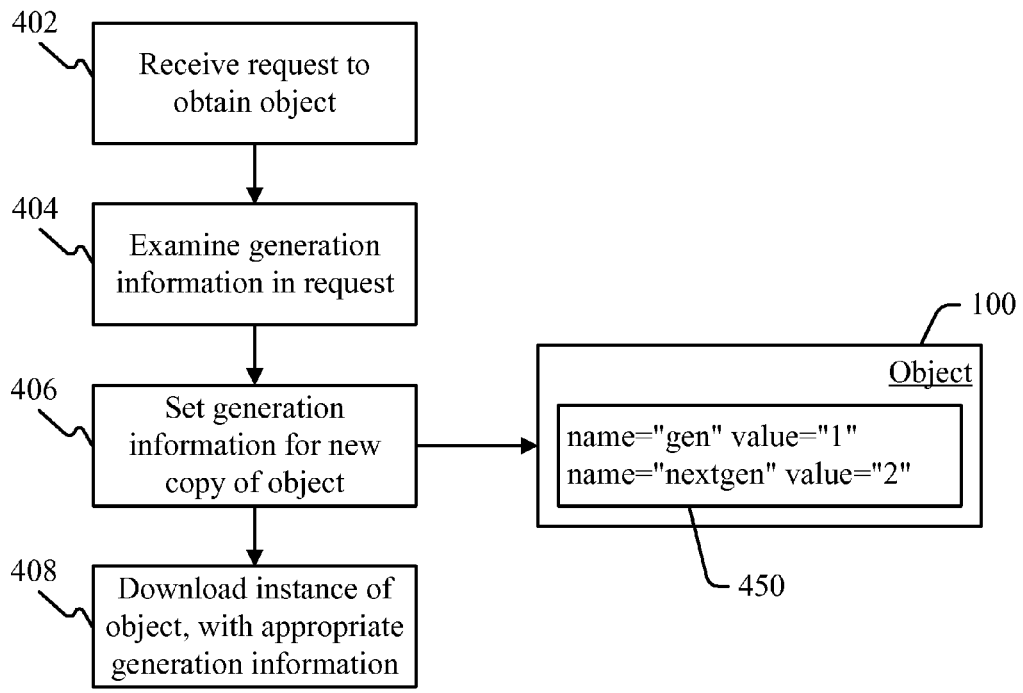
FIG. 4 is a flow diagram of an example process in which an instance of an object is provided that incorporates generation information.
Figure 6:
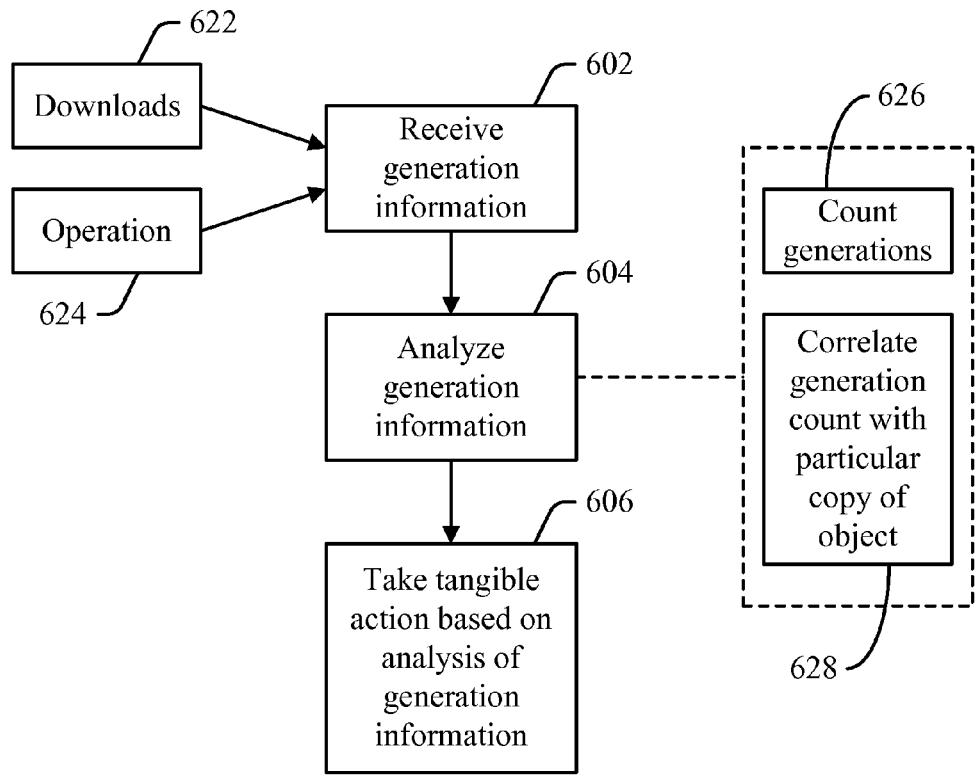
FIG. 6 is a flow diagram of an example process in which generation information may be collected and analyzed.
Figure 8:
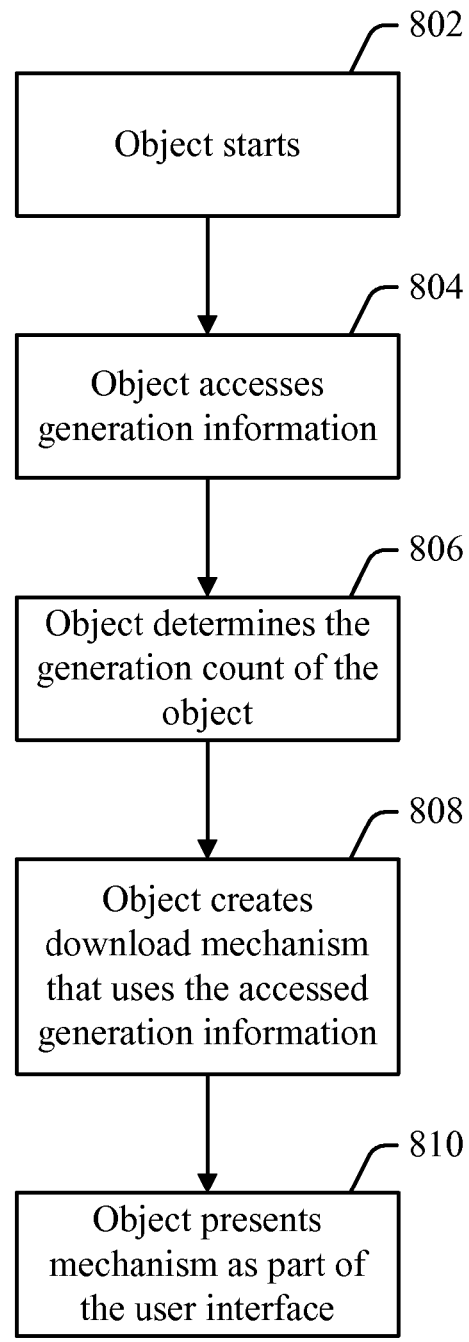
FIG. 8 is a flow diagram of an example process in which generation information stored in an object could be used.

FIG. 4 shows an example process in which an instance of an object is provided that incorporates certain generation information. Before turning to a description of FIG. 4, it is noted that the flow diagrams (in FIG. 4, as well as in FIGS. 6 and 8) are described, by way of example, with reference to systems and components shown and described herein, although these processes may be carried out in any system using any components and are not limited to the scenario described herein. Additionally, each of the flow diagrams in FIGS. 4, 6, and 8 shows an example in which stages of a process are carried out in a particular order, as indicated by the lines connecting the blocks, but the various stages shown in these diagrams may be performed in any order, or in any combination or sub-combination.

Turning now to FIG. 4, at 402, a request to download the object is received. For example, link 204 (shown in FIGS. 2 and 3) may be clicked, thereby causing a request to be made to the download server. As discussed above in connection with FIGS. 2 and 3, this link may have been presented to a user by an instance of the object to be downloaded, and the link may incorporate generation information. At 404, the generation information in the request may be examined. For example, if the request contains generation information (e.g., the "GEN=0" strings shown in FIG. 3), then this information may be examined.

Based on the generation information provided with the request, at 406 generation information may be set for the new instance of the object, which will later be provided in response to the request. Thus, if the request indicates that the request was referred by a zero-th generation instance of the object, then a new instance of the object may have its generation information set to one (or any other representation of the next generation number). For example, object 100 may contain a tag 450 that defines the values of certain variables. In the example of FIG. 4, tag 450 defines a variable named "gen" as having the value "1", and defines a variable named "nextgen" as having the value "2". Thus, the "gen" variable indicates that the particular instance of object 100 that is being provided is of generation one (since the download of that instance resulted from a referral by a zero-th generation instance of object 100). Additionally, the "nextgen" variable indicates the generational value that would be assigned to any instance of object 100 that results from a later referral by the new instance. (Storing both the "gen" and "nextgen" values may be redundant, since one could be inferred from the other, but some implementations may store both values.) At 406, these values may be set for the particular instance of the object that is to be provided (e.g., by inserting the text "value='1'" and ""value='2'" in the appropriate places in the object).

At 408, an instance of the object is downloaded to a machine. For example, if the request that was received at 402 originated at a particular user's machine, then an instance of the object may be downloaded to that user's machine. The instance of the object that is downloaded has the generation information set, as described above.

Figure 5:
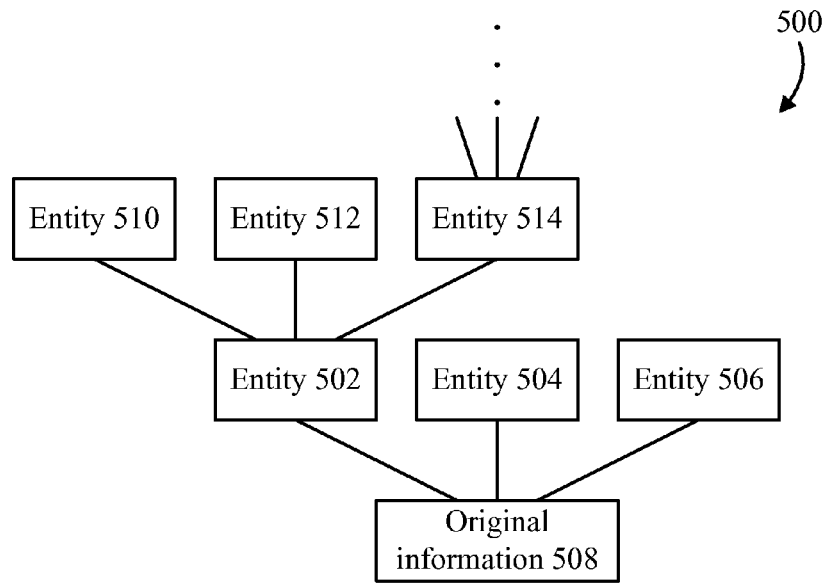
FIG. 5 is a block diagram of a tree that shows an example way in which an object may propagate through a plurality of entities.

When the concept of a generation is applied to the distribution of object 100, the relationship among entities that acquire object 100 may be viewed in the form of a tree 500, such as that shown in FIG. 5. One or more entities (e.g., entities 502, 504, and 506) acquire the object based on some source of original information 508. For example, entities 502-506 may learn of the object through advertising or word-of-mouth. Each of these entities may obtain an instance of the object without having been referred through another instance of the object. Thus, the instances that entities 502-506 hold may be viewed as generation zero instances of the object. (Entities 502-506 are thus examples of entities that obtained an object through an "organic source.") Through the mechanism described above, the instances of the object held by one or more of entities 502-506 may refer users to download new instances of the object. If such a referral results in a new download, then the newly-downloaded instance is a generation one instance of the object. For example, if entities 510, 512, and 514 obtained instances of the object through a referral made by entity 502's instance, then the copies held by entities 510-512 are generation one instances of the object. As indicated by the vertical ellipsis in FIG. 5, any of these generation one instances may result in further referrals.

The information represented by tree 500 may suggest certain information about the distribution of an object. For example, the fact that an object is observed to have instances whose generation number is greater than zero may suggest that the object has certain qualities that inspire users to propagate the object (and these qualities might be emulated in making future objects, if the creators of such objects want the objects to propagate through social networks). Additionally, if an object's lineage can be traced back to a particular instance, then additional analysis could be made. For example, tree 500 indicates that entity 502 made referrals that produced further generations of the object, but entities 504 and 506 did not. From this fact, it might be inferred that entity 502 is particularly good at propagating objects, and thus an object creator or promoter might, in the future, focus on distributing objects to entity 502 as a way to increase the likelihood that those objects will be propagated.

As noted above, generation information may be used to analyze how an object propagates through a collection of entities (e.g., through a social network). FIG. 6 shows an example process in which generation information may be collected and analyzed.

At 602, generation information may be received. The generation information could be received by any entity, such as an analytics organization that has been engaged to perform analysis on a particular object. The generation information that is received may come from various sources. One example of a source is downloads 622. When users download instances of an object, the download server may receive information about the generation of the object that referred the user to the download server, through processes and mechanisms that are described above. In this way, downloads 622 are a source of generation information. Another source of generation information may be the operation 624 of the objects. For example, an object may be configured to contact a server sometime during the course of its operation, and to report its generation to the server. The foregoing are some examples, although the generation information could be received in any manner.

At 604, the generation information may be analyzed. For example, if the generation numbers of various instances of an object are known, then it can be determined from analyzing the generation numbers how far an object propagates from an organic source (e.g., by counting generations, at 626). Additionally, if the generation data contains the identity of a referral source for a given object, then the lineage of objects may be traced back to a source (e.g., by correlating a generation count with a particular copy of an object, at 628). By analyzing the generation information to determine how many downloads of an object resulted from a particular referring source, it may be determined how effective the entity associated with that source is at propagating objects. A feature that helps (or hinders) propagation of an object may be referred to as a propagation quality. A propagation quality may be a feature of an object, or of the manner in which the object is distributed. The analysis performed at 604 may help to discover the existence of propagation qualities (or may be used to deduce that the object, or its manner of distribution, has a positive or negative propagation quality, even if the analysis does not identify the particular propagation quality involved).

At 606, a tangible action may be taken based on analysis of the generation information. For example, a report could be generated indicating how well a particular object has propagated through a social network (or through some other collection of entities). As another example, a new object could be designed to incorporate features that are present in objects that have propagated successfully (as shown by the analysis performed at 604), and to avoid those features that analysis shows have not caused objects to propagate successfully. An object designed with such considerations in mind could be promoted through appropriate channels and/or distributed to one or more users. The foregoing are some examples of tangible actions that could be taken at 606, although any action could be taken.

The foregoing discussion of the stages of FIG. 6 is based on the example in which generation information is used to analyze, forensically, how well an object has propagated. However, the downloading of a new instance of an object could also be performed using some or all of the stages in FIG. 6.

For example, when a referral is made to obtain an object, generation information is received (at 602). Moreover, when the generation information that is received is used to determine what generation number to assign to a new instance of the object, this use is an example of analyzing the generation information (at 604). And the creation of a new object with the generation number, and downloading such an object to a machine, are examples of tangible actions (at 606).

Figure 7:
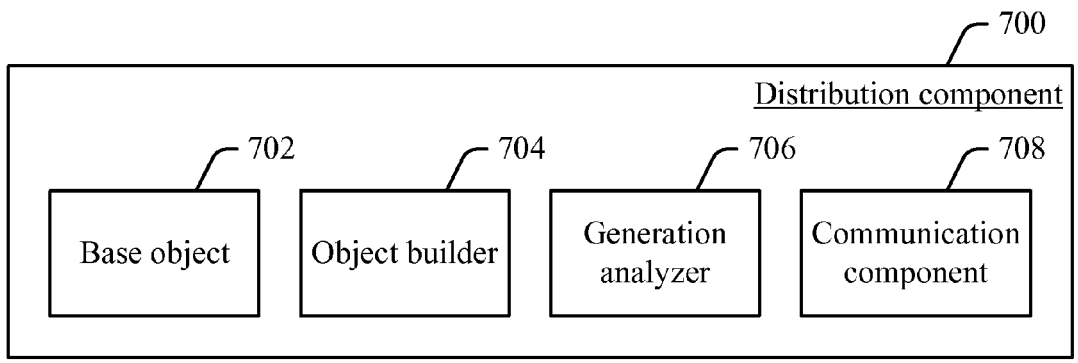
FIG. 7 is a block diagram of an example distribution component that could be used to distribute an instance of an object.

FIG. 7 shows an example distribution component 700, which could be used to distribute an object. For example, distribution component 700 could be used by a download server that distributes instances of an object.

Distribution component 700 may comprise, or otherwise make use of, a base object 702 and an object builder 704. Base object 702 contains the data and/or code to perform whatever function the object will perform. For example, if the object is a weather widget, then base object 702 could contain the code to display the weather. If the object is a video, then base object 702 could contain video data and the code to implement a video player. Base object 702 may also contain space to store generation information, or may contain some default generation information that could subsequently be replaced with actual generation information. Object builder 704 is a component that creates the instance of the object that will be downloaded to a machine, with appropriate generation information incorporated. Object builder may create this object instance by starting with a copy of base object 702, and putting the generation information into the object (e.g., by adding the generation information to the object, by substituting the generation information in place of base object 702's default information, etc.). For example, if a zero-th generation instance of an object has referred a download of an object, then object builder could create an object instance that contains the code and/or data of base object 702, and could insert data that identifies the new object instance as generation one. Thus, if base object 702 contains space to store the generation information, then the indication that the object is generation one could be inserted into that space by object builder 704. (E.g., base object 702 might contain tag 450, shown in FIG. 4, but with variables whose values are initially unset.) Or, if base object 702 contains some default generation information, then object builder 704 could replace the default information with an indication that the object is generation one. In this sense, base object 702 is a version of an object that either lacks generation information, or that has some sort of default generation information that could later be replaced by object builder 704.

Distribution component 700 may also contain a generation analyzer 706, which may perform some or all of the functions of analyzing generation information. As described above in connection with FIG. 6, generation information about existing instances of objects may be received, and this information may be analyzed as a basis to take an action. Generation analyzer 706 may be used to perform this analysis. In the example of FIG. 7, generation analyzer 706 is shown as being part of the same component that adds generation information to an instance of an object. A single entity could perform the functions of creating and/or distributing generation-tagged object instances, and of analyzing generation information about existing object instances. Such an entity could use a structure such as that shown in FIG. 7. However, the various functions described above could be performed by separate entities. For example, an analytics company could be engaged to analyze generation information, while one or more other organizations could perform other functions, such as creating, promoting, and/or distributing instances of an object. In general, the various functions described herein could be distributed among any number of entities.

Distribution component 700 may also contain a communication component 708. When object builder 704 has created an instance of an object, communication component 708 may be used to communicate the created object instance to a machine. For example, communication component 708 may comprise networking software and/or hardware, and may be used to send and/or receive information over a network.

As described above, an object may present a mechanism that allows a user to obtain a copy of the object (e.g., mechanism 106, shown in FIG. 1). The mechanism might take the form of a link (e.g., link 204, shown in FIGS. 2 and 3), which points to a download server and also may indicate the generation of the referring object. The following is a description of one example way in which the object could include the generation information within the link (or within some other mechanism to obtain a copy of an object).

The generation of a particular object may be stored as data within the object. For example, a variable defined within HTML code could store the current generation of the object. The code in the object itself could obtain the object's current generation from the variable, and could use this information to incorporate the object's generation within the link (or other mechanism) that allows users to obtain copies of the object. FIG. 8 shows an example process by which generation information could be used in this manner.

At 802, the object starts. At 804, the object accesses the generation information contained within its data. For example, if the generation information is incorporated within a variable, then the object may examine the variable. There could be an action tag within the object that retrieves the variable. At 806, the object determines its own generation count based on the accessed generation information. At 808, the object creates a download mechanism that uses the accessed information—e.g., the object might create a link such as that shown in FIG. 3, which includes strings such as "GEN=0". The fact that the link sets "GEN=0" may be based on the object having determined, based on the generation information that was accessed at 804, that the object's generation count is zero. The object may present this link (or other mechanism) as part of a user interface that is displayed to a user (at 810). As discussed above, the link that is created may be used to facilitate a user's obtaining of an instance of the object.

The object could evaluate the generation information against some validity criterion. For example, there is a possibility that—through errors or tampering—the "generation" or "next generation" values might be undefined, or set to values that are not numbers, or are set to negative numbers, etc. The object could detect these types of erroneous values. For example, if the generation number is found to be negative, then the object might have a rule that says that such an object is to be treated as an object of generation two. Thus, when the object creates a download link, it could include a string such as "GEN=2" in the link, even if the internal generation information stored in the object contained an error instead of an actual generation value.

Figure 9:
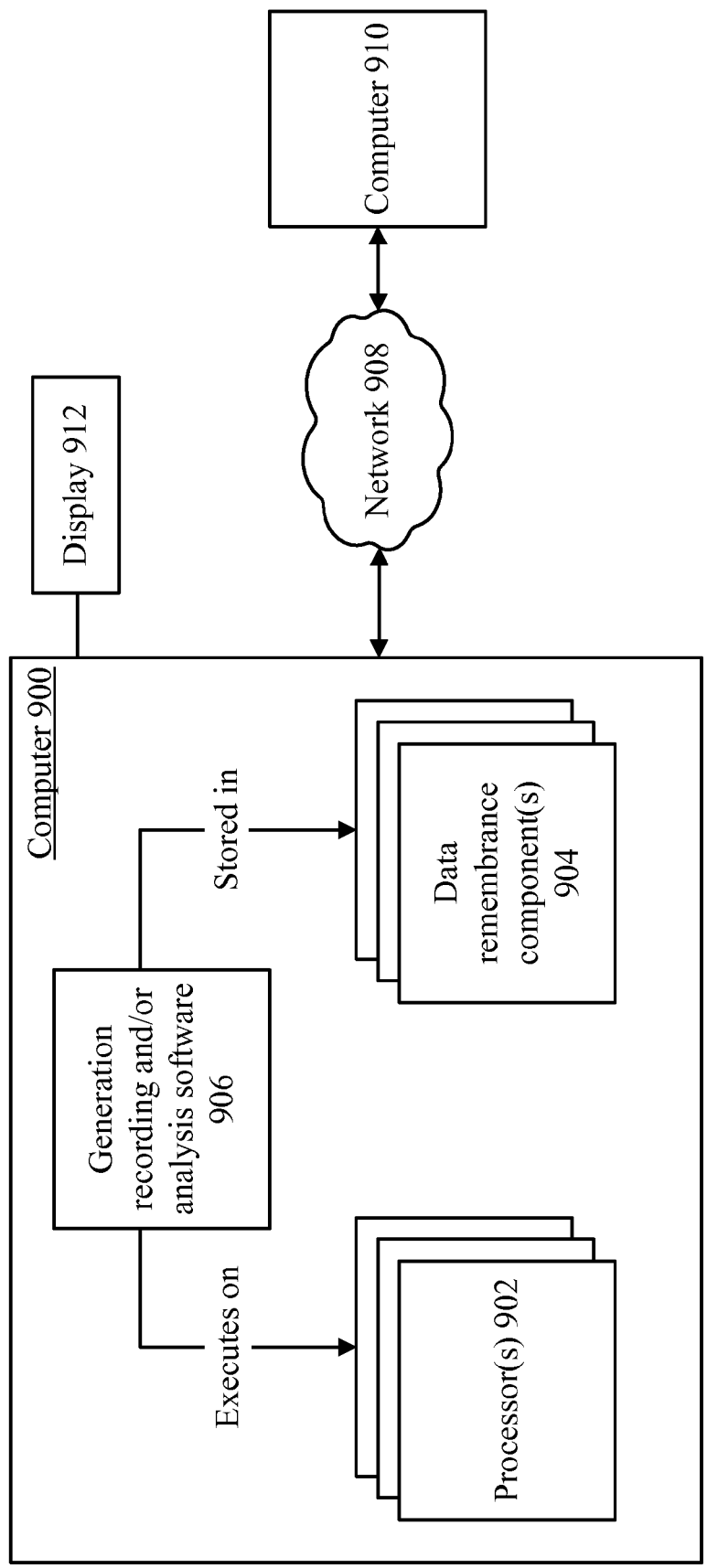
FIG. 9 is a block diagram of example components that may be used in connection with implementations of the subject matter described herein.

FIG. 9 shows an example environment in which aspects of the subject matter described herein may be deployed.

Computer 900 includes one or more processors 902 and one or more data remembrance components 904. Processor (s) 902 are typically microprocessors, such as those found in a personal desktop or laptop computer, a server, a handheld computer, or another kind of computing device. Data remembrance component(s) 904 are components that are capable of storing data for either the short or long term. Examples of data remembrance component(s) 904 include hard disks, removable disks (including optical and magnetic disks), volatile and non-volatile random-access memory (RAM), read-only memory (ROM), flash memory, magnetic tape, etc. Data remembrance component(s) are examples of computer-readable storage media. Computer 900 may comprise, or be associated with, display 912, which may be a cathode ray tube (CRT) monitor, a liquid crystal display (LCD) monitor, or any other type of monitor.

Software may be stored in the data remembrance component(s) 904, and may execute on the one or more processor(s) 902. An example of such software is generation recording and/or analysis software 906, which may implement some or all of the functionality described above in connection with FIGS. 1-8, although any type of software could be used. Software 906 may be implemented, for example, through one or more components, which may be components in a distributed system, separate files, separate functions, separate objects, separate lines of code, etc. A personal computer in which a program is stored on hard disk, loaded into RAM, and executed on the computer's processor(s) typifies the scenario depicted in FIG. 9, although the subject matter described herein is not limited to this example.

The subject matter described herein can be implemented as software that is stored in one or more of the data remembrance component(s) 904 and that executes on one or more of the processor(s) 902. As another example, the subject matter can be implemented as software having instructions to perform one or more acts of a method, where the instructions are stored on one or more computer-readable storage media. The instructions to perform the acts could be stored on one medium, or could be spread out across plural media, so that the instructions might appear collectively on the one or more computer-readable storage media, regardless of whether all of the instructions happen to be on the same medium.

In one example environment, computer 900 may be communicatively connected to one or more other devices through network 908. Computer 910, which may be similar in structure to computer 900, is an example of a device that can be connected to computer 900, although other types of devices may also be so connected.

It is noted that some components in the appended claims are referred to with ordinal labels (e.g., "first generation," "second generation," etc.). The use of labels such as "first" and "second" is used to distinguish two uses of the same word (two uses of the word "generation," in the foregoing example), but does not imply an order. For example, the fact that two generations might be referred to as "first generation" and "second generation" in the claims does not necessarily mean that the first generation precedes the second generation.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. One or more computer-readable memories, disks, and/or storage devices that store executable instructions to perform a method of facilitating obtaining an object, the method comprising:

accessing generation information within a first instance of the object, said object being audio, video, a moving image, or an application, said first instance of the object being a copy of the object with the generation information included in the first instance of the object;

determining, based on said generation information, a first generation count of said first instance, said first generation count being based on a length of a chain of referrals that led to obtaining said first instance;

creating a mechanism to contact a download site to obtain a second instance of the object, said mechanism indicating a second generation count that is to be assigned to said second instance of the object in an event in which said mechanism refers a download of said second instance of the object; and presenting said mechanism in a user interface associated with said first instance of the object, said creating of said mechanism comprising:

creating a link to said download site, said link comprising a Uniform Resource Locator (URL) of said download site and a representation of said first generation count or said second generation count, said link further comprising an indication of a source, said source being a generation zero instance of said object that was obtained without having been referred through other instances of said object, said source being other than said first instance of said object.

2. The one or more computer-readable memories, disks, and/or storage devices of claim 1, wherein said mechanism indicates said second generation count by incorporating, within said mechanism, a number that identifies said second generation count.

3. The one or more computer-readable memories, disks, and/or storage devices of claim 1, wherein said mechanism indicates said second generation count by incorporating, within said mechanism, a number that identifies said first generation count.

4. The one or more computer-readable memories, disks, and/or storage devices of claim 1, wherein said object comprises content that is displayable on a web page, or that interacts with a user through a web page.

5. The one or more computer-readable memories, disks, and/or storage devices of claim 1, wherein the method further comprises:

evaluating said generation information against a validity criterion.

6. The one or more computer-readable memories, disks, and/or storage devices of claim 1, said indication of said source being identified by a string that does not identify a person or entity associated with said source.

7. A method of analyzing generation information about a first object, the method comprising:

receiving, from within a first instance of the first object, data on a length of a chain of referrals that led to the first instance of the first object being obtained, the first object being audio, video, a moving image, or an application, the data being incorporated into a link to a download site from which said first instance of the first object is obtained, said link comprising an indication of a source, said source being a generation zero instance of said object that was obtained without having been referred through other instances of said object, said source being other than said first instance of said object;

analyzing said data to determine existence of a propagation quality associated with the first object or with a manner of distributing the first object; and taking at least one action based on said propagation quality, said action comprising: incorporating generation information in a second instance of the first object, or incorporating said propagation quality in a second object or in an aspect of distributing said second object.

8. The method of claim 7, wherein said analyzing comprising:

counting a number of referrals that led from an organic source of the first object to said first instance of said first object.

9. The method of claim 7, wherein said data comprises an identifier of a third instance of the first object, wherein said analyzing comprises:

determining, based on said identifier and said length, how many copies of the first object are traceable, through a chain, to said third instance of the first object, said third instance being either (a) said first instance of the first object, or (b) an instance of the first object other than said first instance.

10. The method of claim 7, wherein said receiving of data comprises:

receiving generation information as part of a request to download the first object.

11. The method of claim 7, wherein said receiving of data comprises:

receiving generation information from instances of the first object, wherein the first object sends said generation information during a course of the first object's operation.

12. The method of claim 7, wherein said taking of said action comprises:

generating a report indicating how many generations of the first object have been referred in the network, and how many copies of the object have been referred at each generation.

13. The method of claim 7, wherein said taking of said action comprises:

designing said second object to incorporate a feature that is present in the first object.

14. The method of claim 7, wherein said taking of said action comprises:

distributing said second object in a way that uses a feature that was or is used in distribution of the first object.

15. A system that distributes an object, the system comprising:

one or more memories;

a version of the object, which is stored in said one or more memories;

an object builder that creates a first instance of the object based on said version, the object including, in said first instance, first generation information that indicates a length of a first chain of referrals that leads from an organic source of referrals to the first instance, said first instance of the object being audio, video, a moving image, or an application; and a communication component that communicates said first instance to a machine that requested to download the object, said machine requesting to download the object through a second instance of the object that presents a link that comprises an indication of the object's source, said source being a generation zero instance of said object that was obtained without having been referred through other instances of said object, said source being other than said first instance of said object.

16. The system of claim 15, a said link incorporating an indication of said second instance's generation, the system further comprising:

a generation analyzer that analyzes said second instance's generation and takes a action based on said second instance's generation.

17. The system of claim 16, wherein said generation analyzer obtains an identity of a third instance of the object that is part of a second chain of one or more referrals that led to obtaining said second instance and takes said action based on said identity, said third instance being either (a) said second instance, or (b) an instance of the object other than said second instance.

18. The system of claim 15, wherein the system obtains second generation information on a second instance of the object and generates, based on said second generation information, a report on propagation of the object through a plurality of entities.

19. The system of claim 15, wherein said version of said object comprises a tag comprising an unset generation variable, and wherein said object builder incorporates said first generation information in said first instance by setting said unset generation variable to a value that represents said first generation information.

20. The system of claim 15, wherein said version of said object comprises a space to store information, and wherein said object builder incorporates said first generation information by putting a representation of said first generation information into said space.

* * * * *